United States Patent [19]

Pierrel

[11] 4,058,153
[45] Nov. 15, 1977

[54] PROCESS FOR CENTRIFUGALLY CASTING SPHEROIDAL GRAPHITE CAST IRON PIPES

[75] Inventor: Michel Pierrel, Pont-A-Mousson, France

[73] Assignee: Pont-A-Mousson S.A., Nancy, France

[21] Appl. No.: 587,564

[22] Filed: June 17, 1975

[30] Foreign Application Priority Data

July 18, 1974   France ................................ 74.24980

[51] Int. Cl.$^2$ ...................... B22D 27/20; B22D 13/02
[52] U.S. Cl. ...................................... 164/58; 164/57; 164/117; 164/122
[58] Field of Search ................... 164/55, 72, 114, 117, 164/57, 122, 298, 299, 301, 58

[56] References Cited

U.S. PATENT DOCUMENTS

| | | | |
|---|---|---|---|
| 2,124,445 | 7/1938 | Carrington | 164/117 X |
| 2,152,717 | 4/1939 | Wehmeier et al. | 164/301 X |
| 2,245,994 | 6/1941 | McWane | 164/117 |
| 3,415,307 | 12/1968 | Schuh et al. | 164/114 |
| 3,916,979 | 11/1975 | Degois et al. | 164/55 X |

Primary Examiner—Francis S. Husar
Assistant Examiner—Gus T. Hampilos
Attorney, Agent, or Firm—Sughrue, Rothwell, Mion, Zinn and Macpeak

[57] ABSTRACT

This process for manufacturing spheroidal graphite cast iron pipes by centrifugal casting has the feature that the rate of the cooling of the liquid iron just centrifugally cast in a tubular layer is increased from a zone of the layer spaced away from the mould to the free inner surface of this tubular layer while the cooling of the liquid iron in the vicinity of the surface of the mould is slowed down.

2 Claims, 15 Drawing Figures

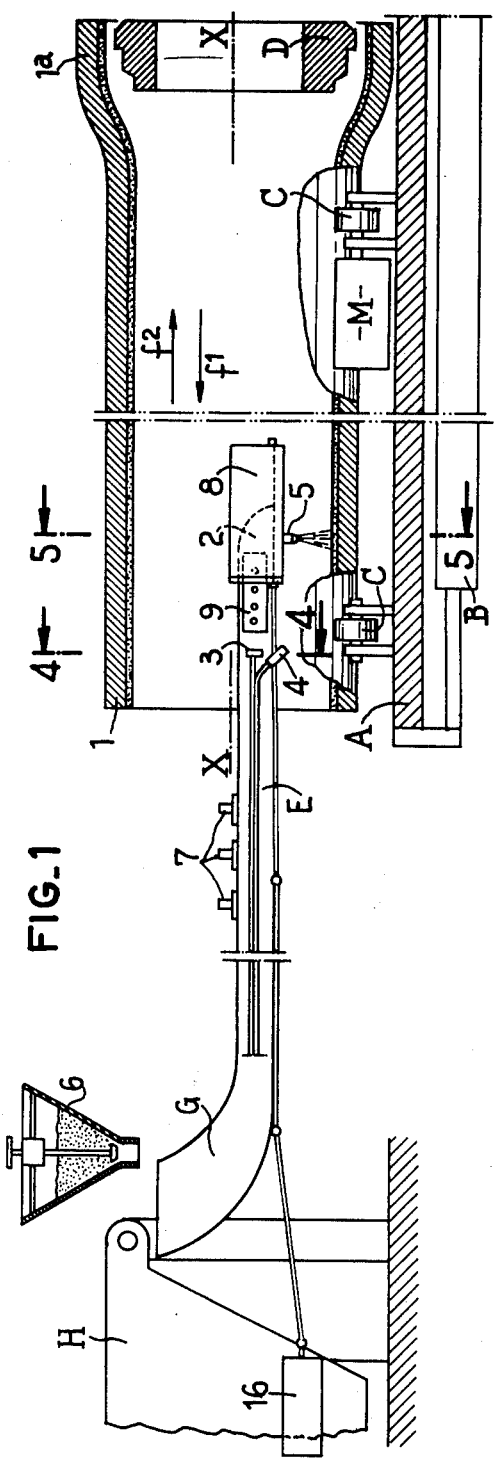
FIG_1
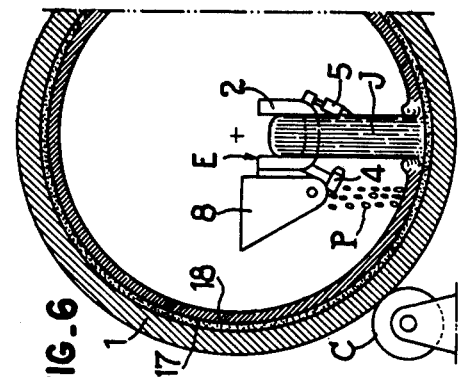
FIG_6
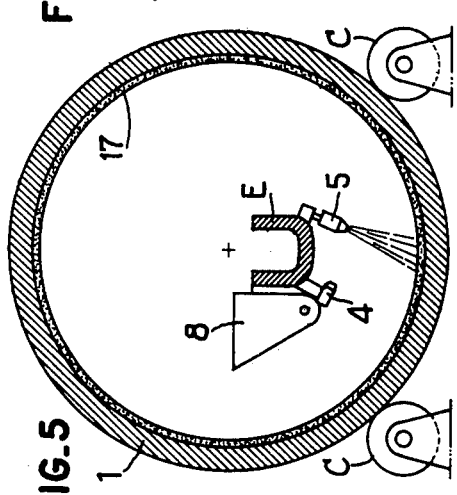
FIG_5
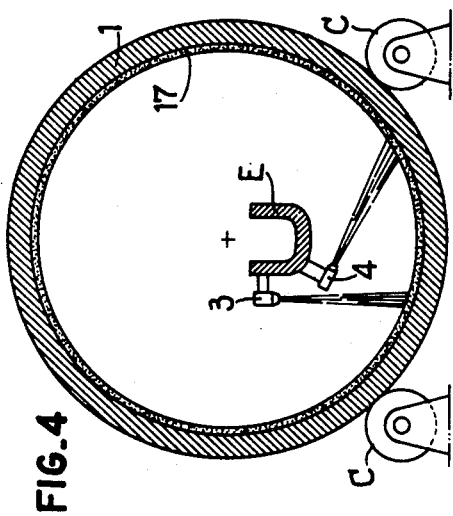
FIG_4

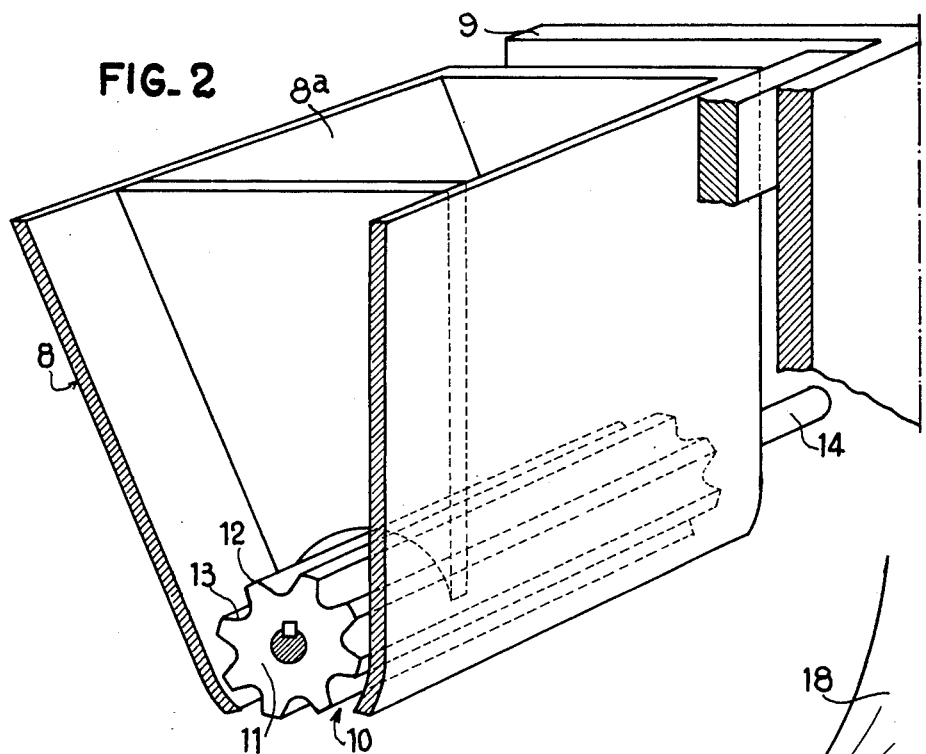
FIG_2
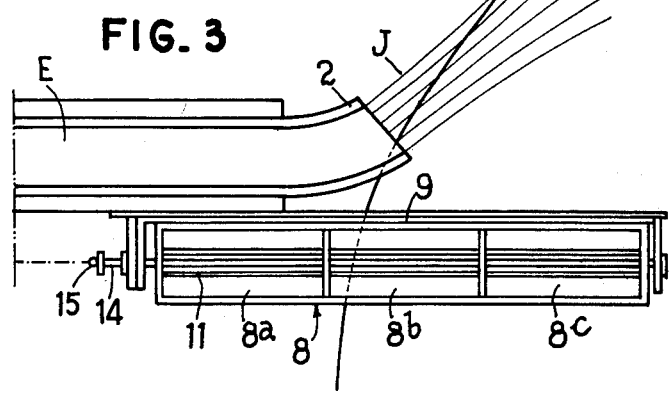
FIG_3
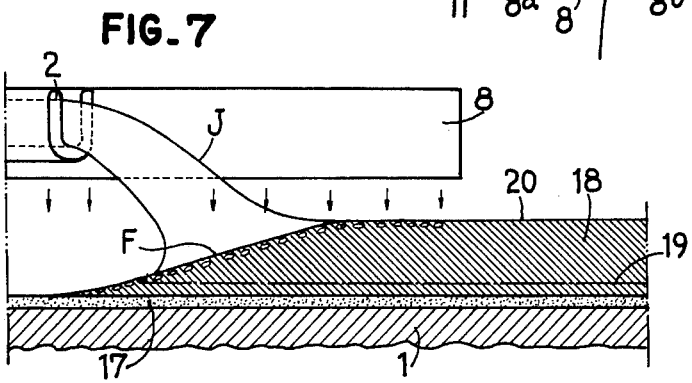
FIG_7

FIG_11
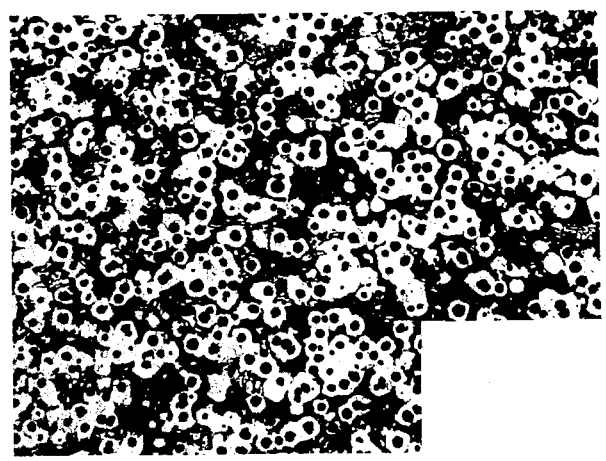
FIG_12
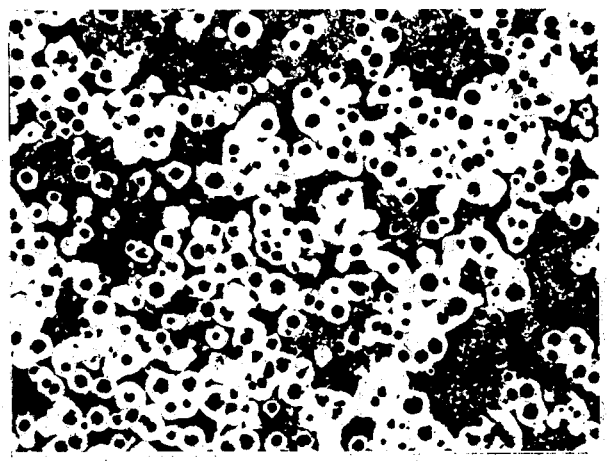

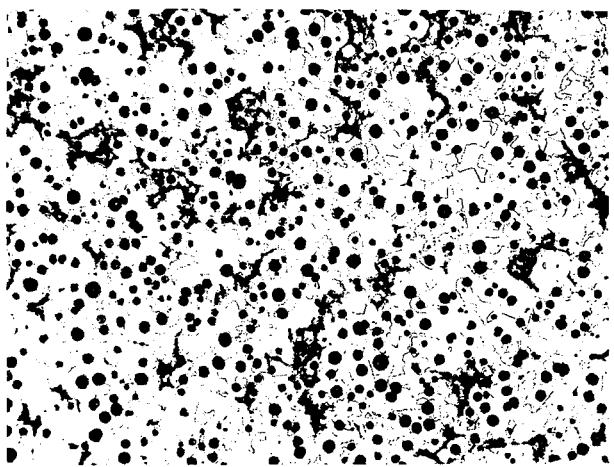
FIG_13
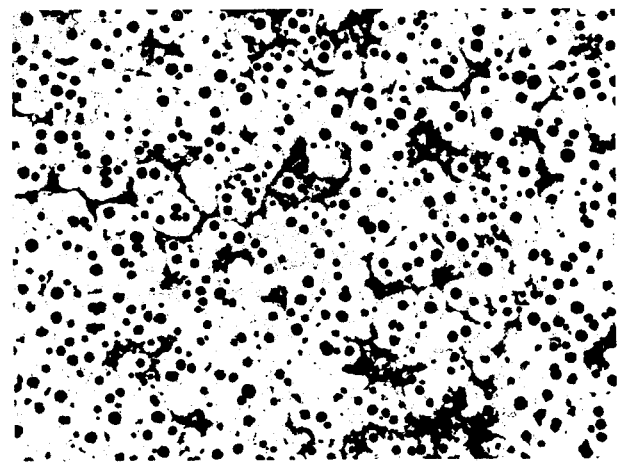
FIG_14
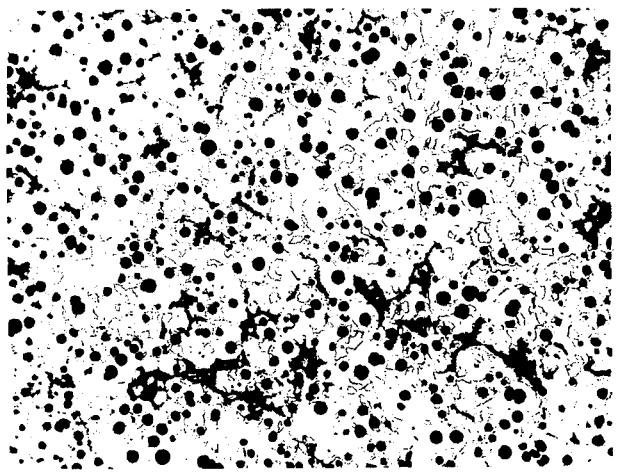
FIG_15

PROCESS FOR CENTRIFUGALLY CASTING SPHEROIDAL GRAPHITE CAST IRON PIPES

The present invention relates to the centrifugal casting of spheroidal graphite cast iron pipes and more particularly to a manner of treating the centrifugally cast liquid iron so as to impart thereto a structure practically devoid of pearlite.

A process for centrifugally casting spheroidal graphite cast iron pipes is known whereby it is possible to cause the cementite of the structure of the pipes to disappear without employing an annealing termed a graphitizing annealing. This known process comprises covering the centrifugal casting mould with a thick inner coating of a "wet-spray" mixture of powdered silicate and bentonite in suspension in water and spraying on the surface of this thick coating, just before casting, a very thin layer of powdered graphitizing inoculating product such as calcium silicide or ferro-silicon. The moulds thus coated are cooled externally by spraying water thereon. This coating essentially avoids an excessively sudden cooling of the iron in contact with the mould and permits obtaining in contact with the mould an iron structure having free graphite rather than a white iron structure which has graphite combined in the form of cementite. However, such a process does not avoid the pearlitic structure.

Now, it is known that a pearlitic structure of iron pipes tends to reduce their resilience and consequently their resistance to shocks when they are handled. This is why, normally, a ferritic structure having no pearlitic structure is preferred.

The pearlite, which is an eutectoid of cementite and alpha iron, can be made to disappear either by an annealing heat treatment of the pipes or by adding to the liquid iron, by inoculation, a high percentage of ferro-silicon or like product. But an excessive silicon percentage in the iron (substantially higher than 3%) also reduces the resilience which is contrary to the purpose of the invention. As concerns the annealing heat treatment, it substantially prolongs the time required to manufacture the pipes and does not avoid risk of deformation thereto when they are being handled.

An object of the invention is to provide a process for casting spheroidal graphite cast iron pipes whereby this pearlitic structure may be avoided which consequently produces pipes having an essentially ferritic structure and a good resistance to shocks without employing an annealing or an excess of inoculating product such as ferro-silicon.

According to the invention, there is provided a process for manufacturing spheroidal graphite cast iron pipes by centrifugally casting, comprising increasing the rate of the cooling of the liquid iron just centrifugally cast in a tubular layer from a zone of the layer spaced away from the mould to the free inner surface of the tubular layer while the cooling of the liquid iron in the vicinity of the surface of the mould is slowed down.

In one manner of carrying out the invention, the iron is poured into a rotary mould provided with a coating of a mixture of silica and bentonite in suspension in water and a thin layer of a powdered inoculating product and the granular particles of a material having a high heat of fusion is poured on the tubular layer of centrifugally cast liquid iron, outside the stream of liquid iron issuing from the outlet end of the pouring channel.

Another object of the invention is to provide a device for depositing a particulate active product, in particular a cooling product, inside the mould of a centrifugal casting machine, comprising at least one particle distributing box which is fixed to the end of the pouring channel of the machine and has in its lower part a longitudinal slot which is closed by a rotary toothed roller driven in rotation by a motor-speed reducer unit.

Further features and advantages of the invention will be apparent from the ensuing description given with reference to the accompanying drawings which are given solely by way of example and in which:

FIG. 1 is a partial diagrammatic longitudinal sectional view of a machine for centrifugally casting cast iron pipes equipped with a device according to the invention;

FIG. 2 is a partial perspective view to an enlarged scale of this device;

FIG. 3 is a plan view of the device;

FIGS. 4 to 6 are cross-sectional views of the centrifugal casting mould taken respectively on lines 4—4, 5—5 and 6—6 of FIG. 1 and illustrating the different stages of the process according to the invention;

FIGS. 7 to 9 are partial longitudinal sectional views to a scale larger than that of FIG. 1 of a layer of centrifugally cast liquid iron treated by the process according to the invention in different manners of carrying out this process;

FIGS. 11 and 12 are micrographs magnified 100 × of a structure of the wall of a pipe centrifugally cast by a known method respectively near to the peripheral edge and near to the edge of the inner cavity and, FIGS. 13 to 15 are similar micrographs of a pipe cast in accordance with the process of the invention respectively near to the outer edge and near to the inner edge of the pipe wall.

Figure 8:
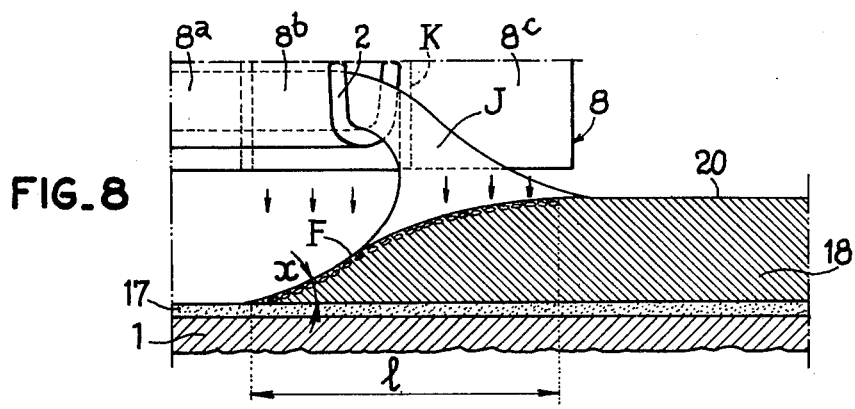

In the embodiment shown in FIGS. 1, 2 and 3, the invention is applied to a machine for centrifugally casting spheroidal graphite cast iron pipes.

This machine comprises essentially a carriage A which is movable in translation by a jack B. This carriage A carries a metal centrifugal casting mould 1 having an axis X—X through rollers C. At least one of the latter is driven, for example, by a motor M. The mould 1 is divergent at one end and defines a socket 1a on which there is secured for each casting a socket core D. The device for externally cooling the mould 1, for example with sprayed water, has not been shown.

Capable of entering the mould 1 in a direction parallel, or roughly parallel, to its axis X—X, is a pouring channel E provided with a shoot G at the upstream end which is supplied with liquid iron by a tiltable ladle H.

The pouring channel E comprises a pouring end or mouth 2 which is offset from the axis X—X (FIG. 3). Near to this pouring mouth there are disposed spraying guns 3, 4 and 5 which are suitably oriented and connected by pipes, secured to the channel E, to containers (not shown) containing powdered products. The guns 3 and 4 located roughly in the same transverse plane are intended to spray onto the surface of the mould 1 a mixture of bentonite and silica in suspension in water or a "wet-spray" mixture in a plurality of layers. The gun 5 is intended to spray a powdered graphitizing inoculating product, for example calcium silicide, onto the surface of the "wet-spray" coating. Suspended above the liquid iron shoot is a metering hopper 6 adapted to pour into the stream of liquid iron flowing through the channel E a powdered inoculating product of a given particle size, for example a ferro-silicon product.

In order to incorporate this inoculating product in the iron in an improved manner, bars of graphite 7 are disposed vertically in the flow section of the channel E so as to produce in the stream of liquid iron a turbulence which promotes the mixing.

By way of a modification, note that the mould 1 may be axially stationary and the pouring channel E and the ladle H made to undergo a movement of translation toward the mould, the essential intention being to achieve a relative movement between the mould 1 and the channel E so as to allow the pouring mouth 2 and the spray guns 3, 4 and 5 to travel throughout the length of the mould 1.

Note also that the guns 3, 4 and 5 are not obligatorily carried solely by the channel E; at least the guns 3 and 4 may be carried by a rod or an additional channel acting as a support. This is moreover essential if there is a rather large number of guns spraying the "wet-spray" mixture, these guns being arranged on a circle for example for evenly spraying layers of "wet-spray" mixture onto a mould of large diameter.

Also, note that the gun 5 may be replaced by a blowing nozzle of known type provided with a number of apertures arranged along the length thereof parallel to the channel E.

The channel E is provided at its end with a box 8 for distributing granular metal particles P. The box 8 (FIG. 3) is shown to be divided into compartments, for example three compartments 8a, 8b and 8c containing particles P having a high heat of fusion and different particle sizes. However, as will be seen hereinafter, in some cases, a box which has only a single compartment may be employed.

The distributing box 8 is secured laterally to the channel E, for example by a bracket 9 (FIGS. 1, 2 and 3). The box 8 has the shape of an elongated V-shaped hopper which extends forwardly of and rearwardly of the pouring mouth 2 of the channel in a direction parallel to the axis X—X. The box 8 has in its lower part and throughout its length a longitudinal opening or rectangular slot 10. The opening 10 is closable by a toothed distributor roller 11. This roller 11 is provided with a longitudinal teeth 12 parallel to the generatrices of the roller and separated by recesses 13 which are in the shape of troughs having a curved bottom and are adapted to be filled with particles P and thereby meter the amount of particles issuing from the box 8 as the roller 11 rotates. The roller 11 may be rotated by means of a line of shafts 14 which are interconnected end-to-end by universal joints 15 and driven by a motor-speed reducer unit 16 which is for example fixed in position upstream of the shoot G of the channel E.

The metal particles P to be distributed by the box 8 and the roller 11 are Fe-Si, Fe-Si-Ca-Zr alloys alone or mixed with steel or cast iron shot so as to increase the heat of fusion as far as possible. In the considered example, the particles P therefore perform the function of an inoculating and cooling product. The size of the particles P may vary from 0.3 to 3 mm, depending on where they are deposited on the tubular layer of centrifugally cast iron with respect to the pouring mouth 2, whereas the particle size of the layer of powdered inoculating product sprayed by the gun 5 may be substantially smaller, for example less than 0.3 mm. The size of the particles P is of the same order of magnitude as that of the inoculating products distributed in a metered amount by the hopper 6 in the shoot G in the stream of liquid iron in the channel E.

With the machine just described, the centrifugal casting of a cast iron pipe is carried out in the following manner (FIGS. 4 to 7):

The distributing box 8 is filled with particles P of the aforementioned cooling and inoculating product.

First stage (FIG. 4). The channel E enters the mould 1 which is driven in rotation and in translation in the direction of arrow $f^1$, and the guns 3 and 4 simultaneously spray a "wet-spray" coating comprising about 500 g of rock silica per square meter onto the inner surface of the metal mould 1. When the guns 3 and 4 have travelled through the entire length of the mould, they are completely withdrawn from the latter (displacement of the mould in the direction $f^2$) to their initial position. A relative movement of translation in the forward and rearward direction of the mould 1 with respect to the channel E is thus effected. At the end of this movement, the cavity of the mould 1 is coated internally with a "wet-spray" coating 17.

Second stage (FIG. 5). While continuing to rotate the mould 1, the gun 5 is actuated and is made to travel throughout the length of the mould 1 coated with the "wet-spray" coating by a further displacement of the mould in the direction $f^1$. In this way, the "wet-spray" coating is covered with a thin coating of powdered inoculating product which may be calcium silicide having a particle size of for example less than 0.3 mm. The amount of inoculating product thus deposited on the surface of the coating 17 is roughly 0.1 to 0.3% by weight of the iron to be subsequently cast in the mould.

After this displacement or forward travel of the mould 1, the gun 5 is located near to the socket core D.

Third stage (FIG. 1). Liquid or molten iron is then poured from the ladle H into the shoot G. A metered amount of inoculating product, metered by the metering hopper 6, is poured into the stream of liquid iron. This metered amount represents about 0.4 to 1% by weight of the iron poured. The particle size of this powdered inoculating product is substantially larger than that of the product sprayed by the gun 5. It is of the order of 0.3 to 3 mm.

During the casting, the mould 1 is moved away from the shoot G by making it effect a return travel (direction $f^2$) so that the mouth 2 of the channel E travels along the entire length of the mould 1 from the socket 1$^a$.

Simultaneously (FIGS. 6 and 7), the distributing roller 7 is driven slowly by the motor-speed reducer 16, the shafts 14 and the universal joints 15. The particles P of cooling and inoculating product are then poured, that is to say allowed to fall, into the cavity of the mould in metered amounts and at an even rate depending on the length, section and number of recesses 13 and on the speed of rotation of the roller 11.

The distributing box 8 is disposed at the end of the channel E and extends forwardly of and rearwardly of the pouring mouth 2 and the particles P fall onto the "front" F of iron deposited on the mould and subjected to the centrifugal action and not into the pouring jet J (FIG. 7).

As this occurs, the particles P while they travel toward the interior of the pipe progressively melt in the centrifugally cast liquid iron 18 and remove heat therefrom and cool it. This effect is noticed in practice in a part ranging from a tubular zone defined by a layer 19 which is not in direct contact with the surface of the coating 17 to the free surface 20 of the layer of liquid iron 18. The layer 19 is located nearer to the coating surface 17 than to the free surface 20 of the layer liquid iron 18. The cooling of the iron is thus accelerated by the partial fusion of the particles P deposited and by the travelling of the remaining un-melted particles P toward the axis X—X through the layer of iron 18 so that a structure which is very poor in pearlite is obtained.

In other words, the cooling of the tubular zone of liquid iron between the coating surface 17 and the layer 19 is slowed down by means of the refractory coating 17 and simultaneously the rate of cooling of the layer of liquid iron between the layer 19 and the free inner surface 20 is on the contrary increased. In this way the cooling is directed toward the axis of the mould which permits avoiding internal shrinkage sinking in while obtaining the desired structure. One tries to obtain cooling rates of the same order in the tubular zones between the layer 19 and the free surface 20.

When the layer 18 of centrifugally cast iron has solidified, the particles P are completely melted therein. This is not clear in FIG. 7 which has merely been provided to show the particles P falling onto the surface of centrifugally cast iron where they melt little by little.

The centrifugally cast pipe is then extracted from the mould in the known manner.

If the structure of the extracted cast pipe T is examined, the following results are observed:
 a. the graphite is spheroidal;
 b. the matrix is 90 to 100% pearlitic;
 c. the mechanical characteristics of spheroidal graphite cast iron standard pipes are complied with;
 d. the analysis of the cast iron is as follows:
 C: 3.4 to 4.00%
 Si: 2.3 to 3.00%
 Mg: 0.015 to 0.030%
 the balance being iron and oligo-elements;
 e. the pipe contains throughout its thickness a roughly uniform percentage of pearlite of less than 10%.

With a higher number of nodules per mm, outside and inside the pipe, the variation in the number of nodules per mm² between the exterior and interior of the pipe is lower when the process according to the invention is employed than in the case of a conventional casting. By way of a numerical example, pipes were centrifugally cast in the manner explained hereinbefore, in accordance with the following data:

First stage. Applying the "wet-spray" coating 17 containing 500 g of rock $SiO_2$ per sq. meter of surface of the mould 1.

Second stage. Covering the coating 17 with a powdered inoculating product such as calcium silicide in an amount of 0.2% with respect to the weight of the iron to be cast and with a particle size of less than 0.1 to 0.2 mm.

Third stage. Pouring by the metering hopper 6 into the stream of liquid iron travelling through the channel E of an amount of powdered inoculating product corresponding to 0.6% by weight of liquid iron to be cast, the particle size being of the order of 0.4 to 2 mm.

Further, in an effective length of the distributing box 8 (length of the roller 11) of between 60 and 80 cm powdering an amount of particles P corresponding to 0.4% by weight of the iron cast, these particles P having a particle size of between 0.4 and 2 mm.

The micrographs shown in FIGS. 11 to 14 are magnified 100 × and come from centrifugally cast spheroidal graphite iron pipes having a diameter of 700 mm. The comparison of the results illustrated in FIGS. 11 and 12, on one hand, and FIGS. 13 and 14, on the other, reveal the advantages of the invention.

The pearlite is recognized in the micrographs by the grey patches whereas the black spots are nodules of free graphite and the white patches represent the ferrite.

a. Pipes cast in accordance with a known process with the machine shown in FIG. 1 devoid of the distributing box 8 (FIGS. 11 and 12):
 Carbon: 3.50%
 Silicon: 2.90%
 Brinell hardness HB halfway through the thickness of the pipe: 235.

FIG. 11 shows the structure of the pipe at 2 mm from the outer peripheral edge, that is to say in the vicinity of the "wet-spray" coating 17: pearlite 30%.

FIG. 12 shows the structure of this pipe at 2 mm from the inner edge, that is to say, the surface 20 of the inner cavity of the pipe: pearlite 25 to 59%.

b. Pipes cast in accordance with the process of the invention carried out with the device shown in FIG. 1 including the box 8 for distributing the particles P:
 Carbon: 3.50%
 Silicon: 2.90%
 Brinell hardness HB halfway through the thickness: 185.

FIGS. 13, 14 and 15 show the structure near to the outer edge in contact with the coating 17, halfway through the thickness, and near to the inner edge, that is to say, the free surface 20 respectively: maximum pearlite about 7%. The uniformity of structure between the FIGS. 13, 14 and 15, as to the density of the nodules is clear. The increase in this density over the known process illustrated in FIGS. 11 and 12 is also clear.

The following description will explain the manner in which it is possible to vary the position of the distributing box 8 with respect to the pouring mouth of the channel E in accordance with the dimension of the stream of liquid iron and the dimension of the "front" F which results therefrom.

FIG. 8 illustrates in a manner similar to FIG. 7 the case of a jet or stream of iron which is but little spread out and corresponds to a speed of rotation of the mould of relatively low value. This stream is characterized by a rather large angle $x$ between the front F of the centrifugally cast liquid and the surface of the coating 17 and by a relatively small axial length $l$ of the front F.

The distributing box 8 is fixed in such manner as to extend forwardly of and rearwardly of the pouring mouth 2, but there are employed only two compartments 8b and 8c separated from each other by a partition wall K located just downstream of the pouring mouth 2. Indeed, in this case, the front of the liquid iron F may be powdered with particles P on a length corresponding to the length of the two compartments of this box. The other compartment 8a is therefore empty in this example.

Figure 9:
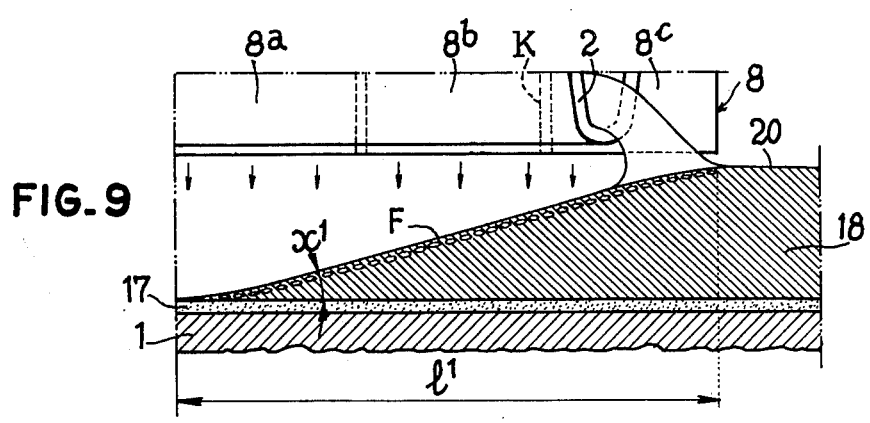

In FIG. 9 there is illustrated the case of a stream or jet of liquid iron which is very spread out and corresponds to a higher speed of rotation of the centrifugal casting mould 1. This is characterized by an angle $x^1$ which is smaller than the angle $x$ and by an axial length $l^1$ of the front F of liquid iron which is substantially greater than the length $l$ of the preceding case. The length $l^1$ roughly corresponds to the total length of the box 8. In this example, the distributing box 8 is fixed more upstream of the pouring mouth 2 than in the example shown in the FIG. 8 so that the three compartments 8a, 8b and 8c which are filled with particles P are in vertical alignment with the iron front F. The compartment 8a corresponding to the part of minimum thickness of the liquid iron front F is filled with particles P having the largest particle size of for example 0.3 to 1.5 mm and the most advanced compartment 8c, corresponding to the part located the nearest to the outlet of liquid iron, is filled with particles P having a smaller particle size of for example between 0.3 and 1 mm.

Note that the length of the stream of liquid iron increases with increase in the speed of rotation of the mould 1, as has been shown hereinbefore with increase in the flow of the stream through the channel E and with increase in the temperature of the iron, the iron being consequently more fluid. In this case, if a sufficient inoculating and above all cooling effect is desired, while making the particles P melt at the latest at their arrival at the surface 20 of the liquid iron front, Applicant has found that it is judicious to decrease the particle size of the metal particles P in accordance with the increase in the thickness of the front F of the liquid iron (the case shown in FIG. 9). This case also corresponds to the casting of very thick pipes.

As can be seen from the examples shown in FIGS. 8 and 9, the effective length of the distributing box 8 corresponds to the length of the front F of liquid iron and the range of particle sizes of the particles P employed varies inversely with the thickness of the front F of the liquid iron.

In the modification shown in FIG. 10, which again shows in plan a channel E and a curved pouring mouth 2, that is to say a mouth which is deviated with respect to the channel E, there are arranged three boxes 21, 22 and 23 for distributing particles P. These three boxes are substantially smaller than the preceding single box 8. Each is divided into two chambers or compartments in the longitudinal direction. The boxes 21 and 22 are for example secured to the same bracket 24 on the channel E in the extension of each other and have extending therethrough a common toothed roller 25 driven by a shaft 26. The box 23 is parallel to the boxes 21 and 22 and secured to one side of the latter, and has extending therethrough a toothed roller 27 which is driven in rotation by a shaft 28. The shafts 26 and 28 are connected by a number of universal joints (not shown) to a single motor-speed reducer unit similar to the motor-speed reducer 16 shown in FIG. 7 which transmits its movement to the two shafts 26 and 28 through gears.

As is the case with the box 8, it is possible to vary in the axial direction the position of the assembly of boxes 21, 22 and 23 with respect to the channel E, that is to say, to vary the overhanging or cantilever relation of these boxes with respect to the pouring mouth 2, by employing judiciously fixing apertures arranged on the fixing bracket and the lateral wall of the channel E. Moreover, in the same way as the box 8, the assembly of boxes 21, 22 and 23 may be mounted either on the level of the pouring channel E or above the latter and laterally.

Figure 10:
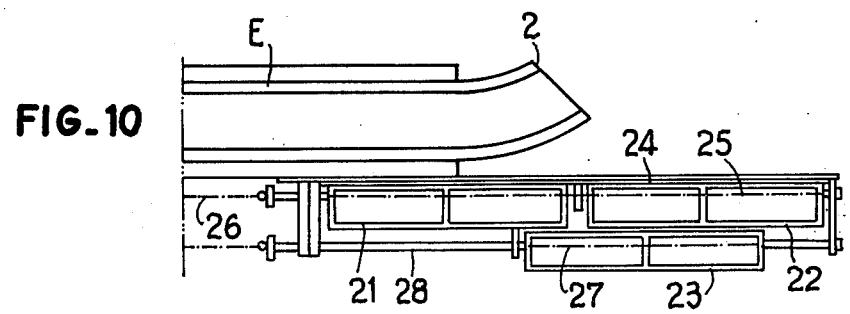
FIG. 10 is a plan view similar to FIG. 3 of a modification of the device according to the invention.

The modification shown in FIG. 10 is advantageous to employ when it is desired to adjust with precision the length of the powdering of the particles P and their particle size to the length and to the thickness of the front F of cast iron in particular when a single centrifugal casting machine must be employed for casting pipes having widely varying diameters and thicknesses, the lengths and the thicknesses of the fronts F of liquid iron being consequently correspondingly also variable. Indeed, with this device, it is thus possible to employ the three devices 21, 22 and 23 or employ only one or two thereof by rotating for example a single of the two shafts 24 and 26 or by filling only a part of the compartment of the boxes, the compartments which are not employed remaining empty.

Finally, note that the amount of particles P to be deposited on the front F of liquid iron may vary along the front F at the same time as the particle size may vary. This amount may be greater near to the coating 17 and the mould than near the free surface 20 of the cast iron. This variation in amount may of course be combined with a variation in the particle size of the particles P. Thus, the cooling may be suitably adapted to the solidification time of the iron, that is to say, to the length and thickness of the front F of liquid iron.

For a front of liquid iron of great length and great thickness, the difference in the solidification time between the peripheral edge of the centrifugally cast liquid, halfway through the thickness and the inner edge of the centrifugally cast layer, is rather large. Correspondingly, a very good inoculating and cooling process is achieved by powdering the front F of liquid iron with particles P of different particle sizes and in different amounts adapted to the gradiant of the thickness of the front F.

I claim:

1. A process for manufacturing spheroidal graphite cast iron by centrifugal casting in a rotary mould, comprising coating the inner surface of the mould with a mixture of silica and bentonite in suspension in water and a thin layer of a powdered inoculating product, pouring liquid iron into the mould from a pouring channel to form a tubular layer of liquid iron in the mould, pouring granular particles of a material having a high heat of fusion on a front of the liquid iron poured into the mould on a length which substantially corresponds to the length of said front and outside the stream of liquid iron issuing from the pouring channel, so as to increase the rate of the cooling of the liquid iron in the form of a tubular layer in the mould, from a zone of the layer spaced from the mould to the free inner surface of the tubular layer while slowing down the cooling of the liquid iron in the vicinity of the surface of the mould, said particles being poured in accordance with a particle size which decreases along the front of the liquid iron when the thickness of the liquid iron defined by said front increases.

2. A process for manufacturing spheroidal graphite cast iron by centrifugal casting in a rotary mould, comprising coating the inner surface of the mould with a mixture of silica and bentonite in suspension in water and a thin layer of a powdered inoculating product, pouring liquid iron into the mould from a pouring channel to form a tubular layer of liquid iron in the mould, pouring granular particles of a material having a high heat of fusion on a front of the liquid iron poured into the mould on a length which substantially corresponds to the length of said front and outside the stream of liquid iron issuing from the pouring channel, so as to increase the rate of the cooling of the liquid iron in the form of a tubular layer in the mould, from a zone of the layer spaced from the mould to the free inner surface of the tubular layer while slowing down the cooling of the liquid in the vicinity of the surface of the mould, said particles being poured in accordance with amounts which decrease along the front of liquid iron when the thickness of the liquid iron defined by said front increases.

* * * * *